Aug. 9, 1927.
P. G. RINKEN
BOWL
Filed Dec. 15, 1926
1,638,409
2 Sheets-Sheet 1
Fig. I.
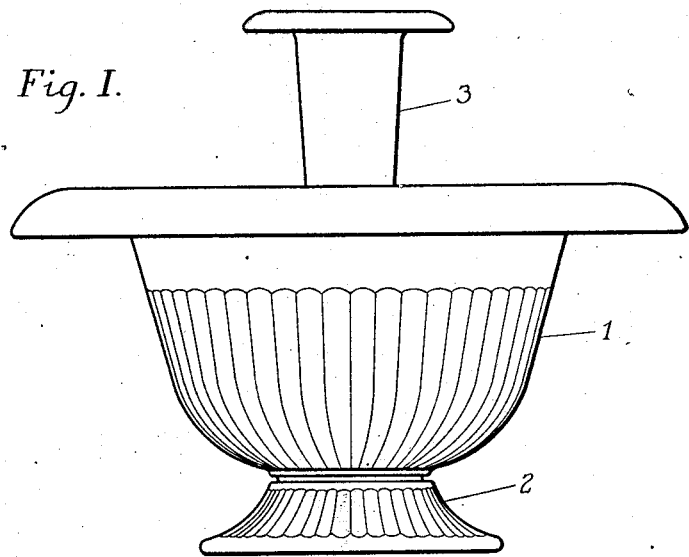
Fig. II.
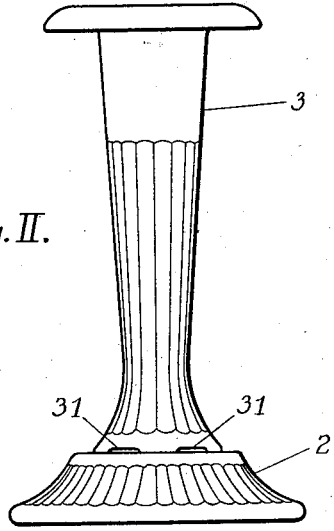
INVENTOR
Peter G. Rinken
by Christy and Christy
his attorneys

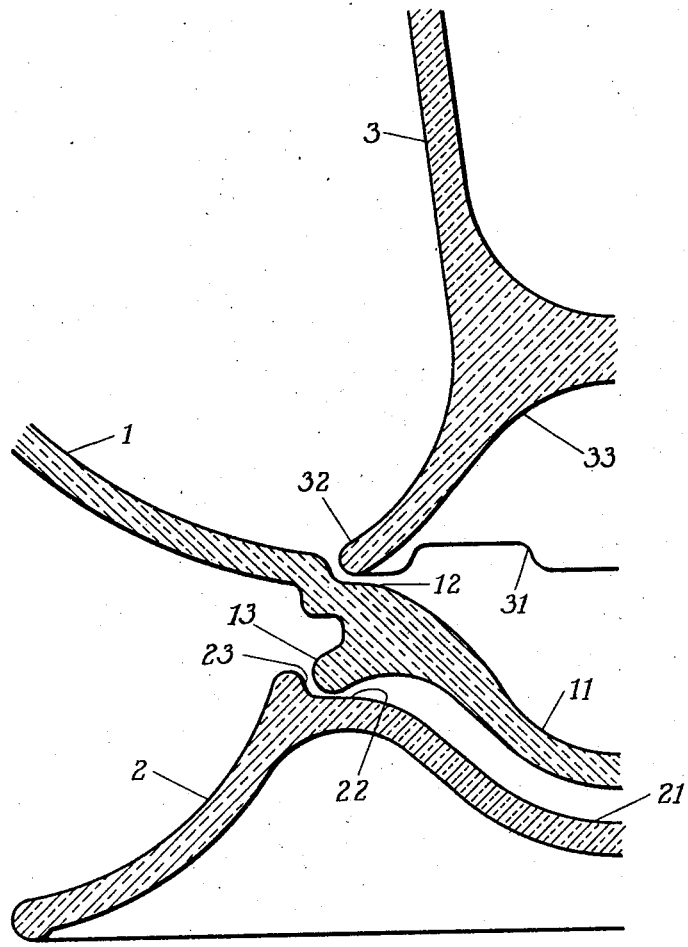
Fig. III.

Patented Aug. 9, 1927.

1,638,409

UNITED STATES PATENT OFFICE.

PETER G. RINKEN, OF CHICAGO, ILLINOIS, ASSIGNOR TO JEANNETTE GLASS COMPANY, OF JEANNETTE, PENNSYLVANIA, A CORPORATION OF PENNSYLVANIA.

BOWL.

Application filed December 15, 1926. Serial No. 154,935.

My invention relates to improvements in the shape of bowls. The bowl of my invention as I have developed it is formed of glassware, but as will be apparent, it might be formed of ceramic ware, or even be sculptured from hard material, for invention lies in shape rather than in a method of production. The object in view is a compound utensil peculiarly adapted to a particular use and at the same time adaptable to other uses.

In the accompanying drawings Fig. I is a view in side elevation of the bowl of my invention completely assembled; Fig. II is a like view of the base member and the vase member assembled without the bowl member; and Fig. III is a fragmentary view in vertical section and to larger scale, illustrating the structure in detail.

The bowl member 1, suitably supported, as upon a separate base member 2, is provided interiorly and centrally, that is to say in its bottom with a sunken pocket 11, best formed by an increase of concavity, a curvature of shortened radius. This region of increased concavity is symmetrical with respect to the axis of the bowl, and, at its periphery, where its inner surface merges into the general curvature of the interior of the bowl, a seat 12 is conveniently formed.

The vase member 3 is provided with a circular foot member 32, adapted to engage the seat 12 of the bowl member, and by such engagement the vase may be caused to stand within the bowl. The circular foot of the vase member is notched, the continuity of its circular extent is interrupted, as at 31, and in consequence, when the vase member is seated in the bowl member, the notches afford spaces through which there is communication from the wider portions of the interior of the bowl to the pocket which the vase spans.

The bowl member of ornamental shape, ordinarily formed of glass, colored or uncolored, is intended to serve as a fish bowl. The pocket is adapted to receive the sediment which accumulates in a fish bowl, and when the vase member is seated within the bowl the pocket spanned by the vase serves as a trap within which such sediment collects, and in consequence the water within the wider portions of the bowl interior is kept relatively cleaner than otherwise would be the case. The vase may manifestly serve as a receptacle for cut flowers and the like enhancing the attractiveness of the article when serving as a fish bowl.

The article preferably is a three-part structure and includes, in addition to bowl member and vase member, a base member as a separate part. This base member 2 is provided above with a sunken circular seat, including vertical boundary walls 23, a horizontally extending marginal area 22, and a socket-like middle depression 21. Correspondingly, when the base is so formed as a separate member, the bowl member is formed exteriorly with a circular foot 13, adapted when the parts are assembled to rest within the walls 23 and upon the marginal area 22 of the base member. Furthermore the formation of the central pocket of increased radius within the bowl conveniently results in an external protrusion at the bottom of bowl, within the circle of the foot 13. This protrusion, when the parts are assembled, extends, as is well shown in Fig. III, into the middle depression 21 in the seat formed in the base member. Preferably there is no contact between the outer surface of this protrusion and the inner surface of the depression 21; preferably, when assembly is made, contact is confined to the engagement of the foot 13 upon the walled seat 22. Nevertheless, there is a ball-and-socket alignment of parts, which not merely provides for the sediment-collecting pocket already described but serves also to insure a greater security to the assembled structure. In applying the bowl member to the base member, this ball-and-socket configuration serves to guide the foot 13 to its seat upon the base member; and, even though the bowl be not squarely seated, the ball-and-socket configuration will prevent any such displacement as might allow the bowl to upset. When the bowl is once properly seated and filled with water, and so rendered heavy, this ball-and-socket configuration cooperates to prevent displacement of the bowl upon its base.

The seat 12 within the bowl and the seat 22 in the base, the foot 32 of the base and the foot 13 of the bowl are preferably so far correlated in size that, the bowl member being removed from the base member, the vase member 3 may be seated immediately upon the base member. The assembly then is that illustrated in Fig. II.

I call attention to the arch 33 within the base of the vase member. This arch, co-operating with the pocket 11, affords a chamber of relatively large capacity, with which the wider volume of the bowl, through the notches 31, has communication. This large chamber is effective to facilitate the collection of sediment in the pocket.

I claim as my invention:

1. A bowl structure including a bowl member and a vase member, the bowl member within and at its bottom being provided with a pocket and with a seat surrounding such pocket, and the vase member being provided with a notched foot, adapted to engage the seat in the bowl member, and being seated to leave communication open to the pocket beneath.

2. A bowl structure including a bowl member and a vase member, the bowl member within and at its bottom being provided with a pocket and with a seat surrounding such pocket, and the vase member being provided with a notched foot, adapted to engage the seat in the bowl member, and with an upwardly arched recess within the foot.

3. A bowl structure including a base member, a bowl member, and a vase member, the base member being provided above with a sunken circular seat having vertical boundary walls, a horizontally extending marginal area, and a socket-like middle depression, the bowl member being provided exteriorly with a circular foot, adapted when the parts are assembled to rest upon the marginal area of the seat in the base member, and with a rounded protrusion, adapted when the parts are assembled to extend within the socket-like depression in the base member, the said bowl member being further provided interiorly with a central bottom pocket, and the said vase member being provided with a notched foot and being adapted to be seated within the bowl member and in a position spanning the said bottom pocket.

4. A bowl structure including a base member, a bowl member, and a vase member, the base member being provided above with a sunken circular seat having vertical boundary walls, a horizontally extending marginal area, and a socket-like middle depression, the bowl member being provided exteriorly with a circular foot, adapted when the parts are assembled to rest upon the marginal area of the seat in the base member, and with a rounded protrusion, adapted when the parts are assembled to extend within the socket-like depression in the base member, the said bowl member being further provided interiorly with a sunken circular seat, and the vase member being provided with a circular foot adapted to rest alternately in the circular seat of the base member or in the circular seat of the bowl member.

In testimony whereof I have hereunto set my hand.

PETER G. RINKEN.